(12) United States Patent
Endo

(10) Patent No.: US 7,445,201 B2
(45) Date of Patent: Nov. 4, 2008

(54) ENGINE MOUNT

(75) Inventor: Masami Endo, Niwa-gun (JP)

(73) Assignee: Tokai Rubber Industries, Ltd., Komaki (JP)

( * ) Notice: Subject to any disclaimer, the term of this patent is extended or adjusted under 35 U.S.C. 154(b) by 316 days.

(21) Appl. No.: 11/089,500

(22) Filed: Mar. 25, 2005

(65) Prior Publication Data

US 2005/0217918 A1  Oct. 6, 2005

(30) Foreign Application Priority Data

Mar. 30, 2004 (JP) ............................. 2004-098120

(51) Int. Cl.
*F16F 7/00* (2006.01)
*F16F 1/44* (2006.01)
(52) U.S. Cl. .................. 267/141; 267/141.2; 267/141.3
(58) Field of Classification Search ................. 267/141, 267/141.2, 141.3, 141.4, 141.5, 293, 294; 248/560, 636, 637
See application file for complete search history.

(56) References Cited

U.S. PATENT DOCUMENTS

| | | | |
|---|---|---|---|
| 4,530,491 A * | 7/1985 | Bucksbee et al. ............ 267/141 |
| 5,129,479 A | 7/1992 | Fujii et al. | |
| 5,172,893 A | 12/1992 | Bouhier et al. ......... 267/140.12 |
| 5,941,511 A * | 8/1999 | Dawda et al. .......... 267/140.12 |
| 6,572,088 B2 * | 6/2003 | Tadano et al. ............ 267/141.3 |

| | | |
|---|---|---|
| 2004/0017034 A1 | 1/2004 | Asano et al. ............. 267/141.2 |

FOREIGN PATENT DOCUMENTS

| | | |
|---|---|---|
| DE | 196 05 859 A1 | 8/1997 |
| GB | 2033533 A * | 5/1980 |
| JP | 03-182837 | 8/1991 |
| JP | U 5-57468 | 7/1993 |
| JP | 6179315 A * | 6/1994 |
| JP | A 10-47402 | 2/1998 |
| JP | 11-182598 | 7/1999 |
| JP | A 2002-114016 | 4/2002 |
| JP | A 2002-155994 | 5/2002 |
| JP | A 2002-276713 | 9/2002 |

* cited by examiner

Primary Examiner—Melody M Burch
(74) Attorney, Agent, or Firm—Oliff & Berridge, PLC

(57) ABSTRACT

An engine mount including: an inner fitting having a first flange at a first axial end thereof; a cylindrical outer fitting having at a first axial end a second flange extending outwardly in the axis-perpendicular direction and positioned in opposition to but spaced apart from the first flange portion in an axial direction; a side rubber elastic body elastically connecting the first and second flanges; a main rubber elastic body elastically connecting the inner fitting and the outer fitting in a direction of axial elongation of the side portion rubber elastic body; and a hollow portion extending from a second axial end toward a first axial end of the main rubber elastic body with a distal and thereof reaching an interior of the side rubber elastic body, thereby bifurcating the main rubber elastic body at an inside circumferential face of the outer fitting. The engine mount is positioned with the axial direction facing a left-right direction of the vehicle.

5 Claims, 6 Drawing Sheets

ENGINE MOUNT

INCORPORATED BY REFERENCE

The disclosure of Japanese Patent Application No. 2004-098120 filed on Mar. 30, 2004 including the specification, drawings and abstract is incorporated heroin by reference in its entirety.

BACKGROUND OF THE INVENTION

1. Field of the Invention

The present invention relates to an engine mount having an inner and an outer metal fitting elastically connected by a rubber elastic body, wherein the inner and outer fittings attached to a component on the engine side and a component on the body-side, to reduce engine vibration.

2. Description of the Related Art

Known engine mounts of this kind for use in automotive vehicles include one with a design such as that taught for example in JP-A-10-47402, which comprises a round cylindrical inner member, a cylindrical outer member disposed coaxially with the inner member and spaced outwardly apart therefrom, and a pair of rubber elastic arms extending from both diametrical sides of the inner member to the outer member to elastically connect the two members. By means of the pair of rubber elastic arms, this engine mount attenuates vibration in the vertical, left-right, and front-back directions of the vehicle. The engine mount has a high spring constant in the vertical and left-right directions with respect to the front-back direction of the vehicle (high spring constant in the axis-perpendicular directions with respect to spring constant in the axial direction), for example, a vertical direction (axis-perpendicular direction):left-right direction (axis-perpendicular direction):front-back direction (axial direction) spring constant ratio on the order of 1:0.3:0.2. The engine mount is installed mounted between the vehicle body and the engine with the axial direction facing front-to-back of the vehicle, in order to provide damping of larger vibration in the vehicle vertical direction and left/right direction by spring in the axis-perpendicular direction, and of smaller vibration in the vehicle front/back direction by spring in the axial direction.

In this type of engine mount, for reasons relating to component space in the vehicle or to engine mount installation, the mounting cannot be positioned with the axial direction in the front-back direction of the vehicle, but must instead be positioned facing in the left-right direction. In the event that the engine mount is positioned with the axial direction facing in the left-right direction of the vehicle, there arises problem of inability to adequate attenuate vibration in the left-right direction due to the low spring constant in the axial direction. That is, in the event that the axial direction of the engine mount is positioned facing in the left-right direction of the vehicle, the vertical direction (axis-perpendicular direction): left-right direction (axial direction): front-back direction (axis-perpendicular direction) spring constant ratio will be on the order of 1:0.2:0.3, with the spring constant in the left-right direction being quite low. In a different design such as that taught in JP-U-5-57468, rubber stops is disposed at the axial ends, so that shook in the axial direction is absorbed by the rubber stops in addition to the rubber elastic body. However, it is difficult to install separate rubber stops on the two axial sides, making the engine mount more expensive.

SUMMARY OF THE INVENTION

It is therefore an object of the present invention to provide an engine mount wherein, by means of increasing spring constant in the axial direction, vibration in the left-right direction can be attenuated to a sufficient extent even where the mounting is installed with its axial direction coincident with the left-right direction of the vehicle, and wherein spring constant in the left-right direction is increased without changing the spring constant ratio in the vehicle vertical and front-back directions, affording case of tuning of the spring constant in three directions.

The above and/or other objects may be attained according to at least one of the following forms of the invention. The following preferred forms of the respective aspects of the invention may be adopted at any possible optional combinations. It is to be understood that the present invention is not limited to the following forms or combinations of these forms, but may otherwise be recognized based on the thought of the present invention that described in the whole specification and drawings or that may be recognized by those skilled in the art in the light of the disclosure in the whole specification and drawings.

According to the principle of the present invention, there is provided an engine mount for use in a vehicle, comprising: an inner fitting having a first flange that extends outwardly in an axis-perpendicular direction at a first axial end thereof; a cylindrical outer fitting disposed surrounding the inner fitting and positioned between two axial ends of the inner fitting, and having at a first axial end thereof a second flange extending outwardly in the axis-perpendicular direction and positioned in opposition to but spaced apart from the first flange portion in an axial direction; a side rubber elastic body elastically connecting the first and second flanges; a main rubber elastic body elastically connecting an outer circumferential face of the inner fitting and an inner circumferential face of the outer fitting in a direction of axial elongation of the side portion rubber elastic body; and a hollow portion extending from a second axial end toward a first axial end of the main rubber elastic body with a distal end thereof reaching as far as an interior of the side rubber elastic body, and bifurcating the main rubber elastic body at an inside circumferential face of the outer fits wherein the engine mount is positioned with the axial direction facing a left-right direction of the vehicle, attached with the inner fitting to either a component on an engine side or a component on a body side of the vehicle, and with the outer fitting to either a component on the engine side or a component on the body side.

In the invention having the arrangement set forth hereinabove, the first flange of the inner fixture and the second flange of the outer fitting are positioned opposed to each other but spaced apart in the axial direction. With the two flanges elastically connected by the side rubber elastic body, the main rubber elastic body is disposed elastically connecting the outer circumferential face of the inner fitting and the inner circumferential face of the outer fitting in the direction of axial elongation of the side portion rubber elastic body. With this arrangement, the spring characteristics in the axial direction are increased appreciably as compared to a conventional engine mount with a main rubber elastic body only. As a result, in the present invention, with the engine mount attached with its axial direction facing in the left-right direction of the vehicle, engine vibration in the left-right direction of the vehicle can be attenuated with certainty.

Further, by providing the main rubber elastic body with a hollow portion that extends from the second axial end to the first end, with the distal end thereof extending out into the interior of the side rubber elastic body, it is possible for the spring constant in the left-right direction (axial direction) of the rubber elastic body to exert no effect on spring constant in vertical and front-back directions which are axis-perpendicular directions, or in other words, to establish it independently of spring constant in the vertical and front-back directions. That is, it becomes easy to tune the ratio of spring constants in three directions, namely, the vertical, left-right, and front-back directions. As a result, in the present invention, spring constants in the vertical, left-right, and front-back directions of the engine mount can be established so as to be properly matched with the vibration characteristics of the vehicle. Also, by providing a hollow portion in the main rubber elastic body, compressing deformation in the vertical direction of the main rubber elastic body can be absorbed by the hollow portion, permitting uniform deformation of the main rubber elastic body.

In the engine mount described above, the hollow portion may also be situated at a medial location in the circumferential direction of the main rubber elastic body. With this arrangement, the main rubber elastic body can be bifurcated equally to either side in the circumferential direction, whereby spring characteristics in the axis-perpendicular direction are set uniformly by means of the main rubber elastic body, and the vibration-attenuating function of the main rubber elastic body is exhibited properly.

Preferably, in the engine mount described above, the inner fitting is of cylindrical shape, attached to a component on the engine side or a component on the body side by means of a mounting member of rod form which is passed through a bore of the inner fitting. By employing an inner fitting of cylindrical shape and attaching the inner fitting to an engine component or body component by means of a bolt or other fastener passed through the bore of the inner fitting in this way, the engine mount can be given a simple configuration that occupies the least space.

Yet preferably, in the engine mount described above, the outer fitting is integrally formed with an engine-side bracket or with an body-side bracket. By means of integrally forming the outer fitting with the engine-side bracket or with the body-side bracket, attachment of the engine mount to the engine side or body side is facilitated, reducing the labor entailed in the mounting procedure.

According to the present invention, by elastically connecting the first flange of the inner fitting with the second flange of the outer fitting, spring characteristics in the axial direction are increased appreciably. As a result, with the engine mount installed on the vehicle with its axial direction facing in the left-right direction of the vehicle, vibration in the left-right direction of the vehicle can be attenuated sufficiently. Additionally, by providing the main rubber elastic body with a hollow portion that extends from the second axial end towards the first end, with the distal end thereof situated within the side rubber elastic body, it is possible for the spring constant in the left-right direction (axial direction) of the rubber elastic body to be established independently of spring constant in the vertical and front-back directions. As a result, spring constant in the vertical, front-back, and left-right directions of the engine mount can be set appropriately matched to vibration characteristics of the vehicle. Also, by providing a hollow portion in the main rubber elastic body, compressing deformation in the vertical direction of the main rubber elastic body is absorbed by the hollow portion, increasing the durability of the main rubber elastic body.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
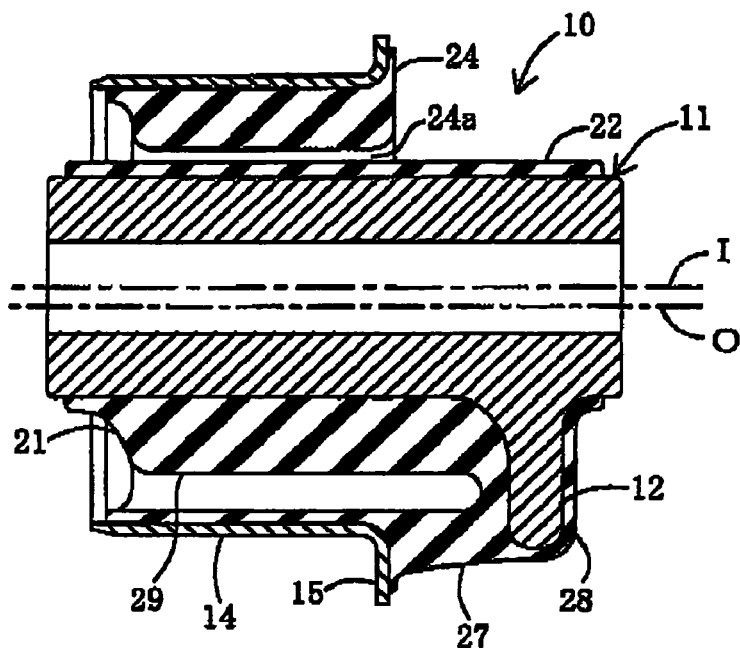
FIG. 1 is an axial cross sectional view of an engine mount of construction according to a first embodiment of the invention, taken along line 1-1 of FIG. 2.
Figure 2:
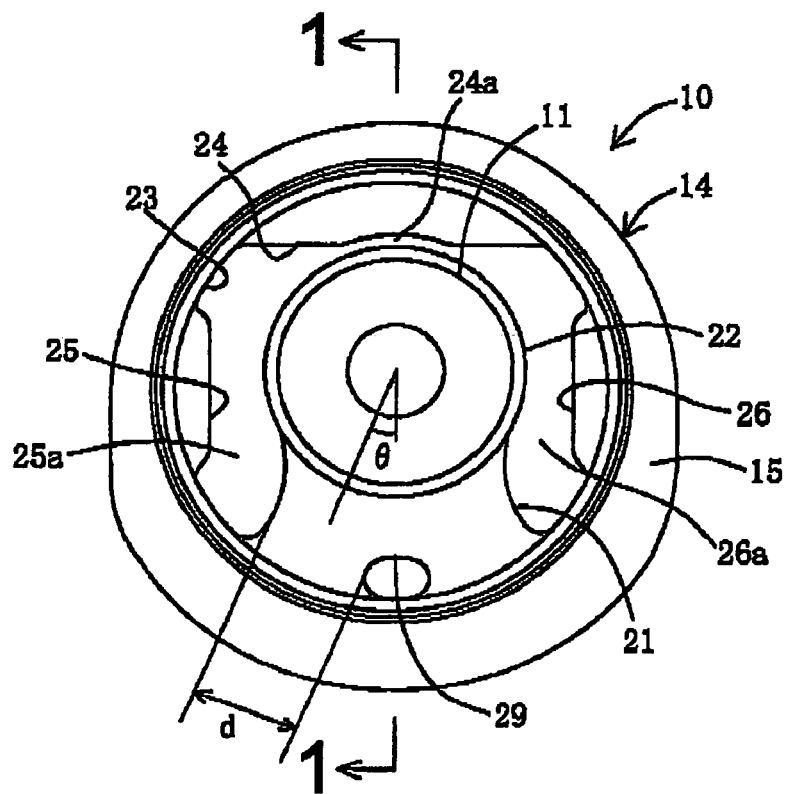
FIG. 2 is a left-side elevational view of the engine mount of FIG. 1.
Figure 3:
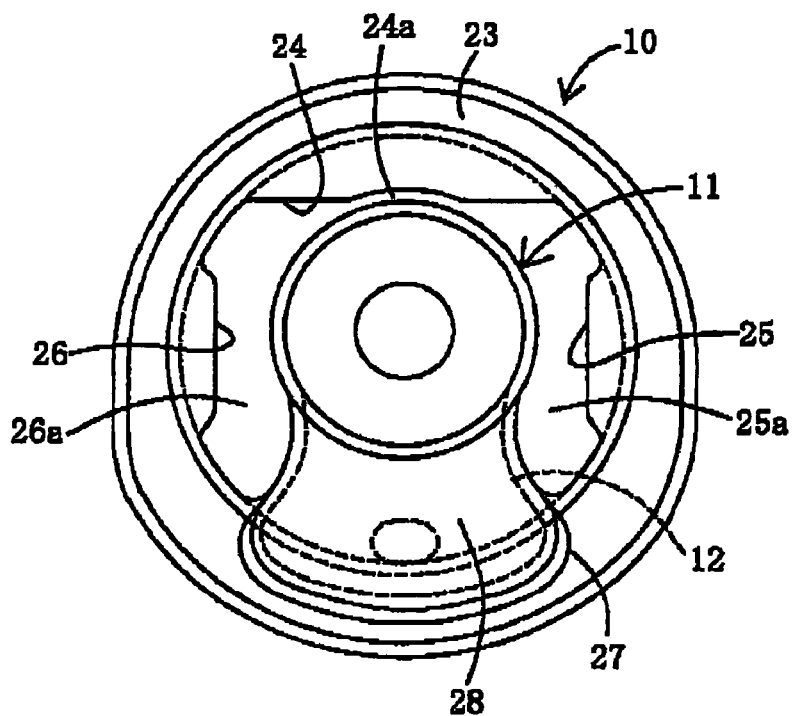
FIG. 3 is a right-side elevational view of the engine mount of FIG. 1.
Figure 4:
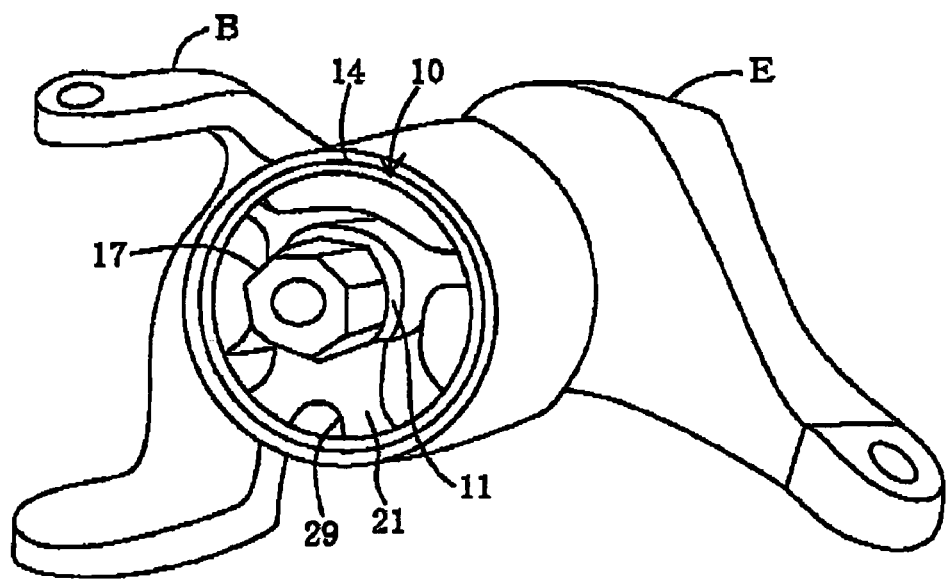
FIG. 4 is a perspective view of the engine mount of FIG. 1 that is installed on an automotive vehicle.
Figure 5:
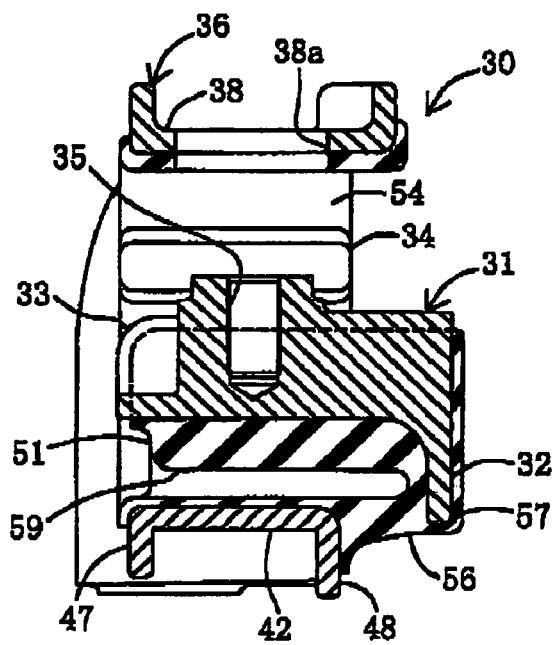
FIG. 5 is an axial cross sectional view of an engine mount of construction according to a second embodiment of the invention, taken along line 5-5 of FIG. 6.
Figure 6:
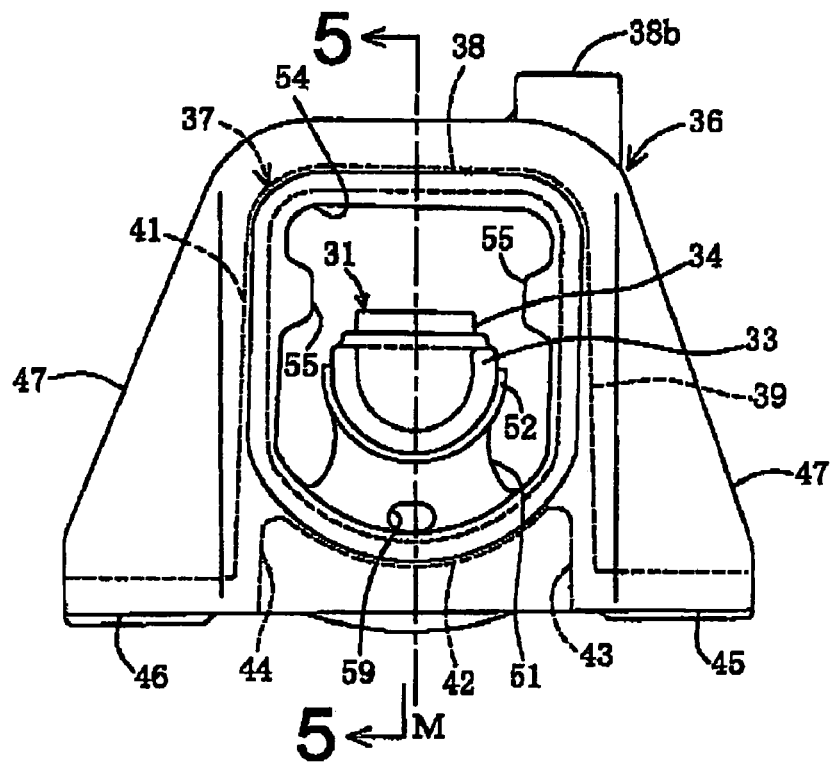
FIG. 6 is a left-side elevational view of the engine mount of FIG. 5.
Figure 7:
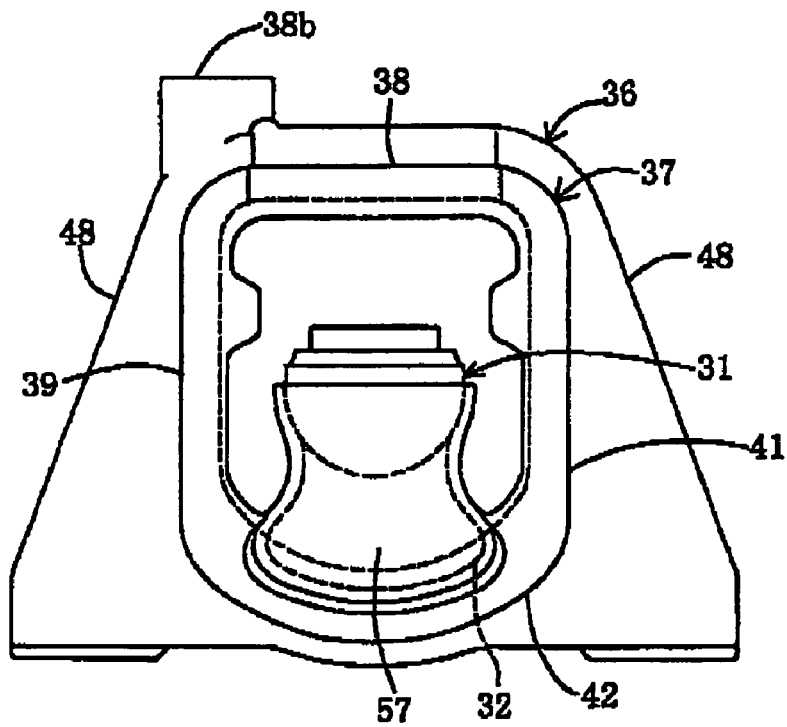
FIG. 7 is a right-side elevational view of the engine mount of FIG. 5.

Following is a description of currently preferred embodiment of the invention, with reference to the accompanying drawings. FIGS. 1-3 are, respectively, a sectional view, a left side view, and a right side view of an engine mount 10 according to a first embodiment, which is a vibration damping device installed between a component on the engine side and a component on the body side of a vehicle. FIG. 4 is a perspective view showing the engine mount installed on a vehicle.

The engine mount 10 comprises a round cylindrical inner fitting 11 having a first flange 12 that extends diametrically outward from a portion of the outside circumferential face at a first axial end. A cylindrical outer fitting 14 disposed surrounding the inner fitting 11 from outside in the diametrical direction and positioned between the two axial ends thereof, and having at a first axial end an annular second flange 15 that extends outwardly in the diametrical direction and is positioned in juxtaposition to but spaced apart from the first flange 12. A main rubber elastic body 21 elastically connecting the outside circumferential face of the inner fitting 11 and the inside circumferential face of the outer fitting 14. A side rubber elastic body 27 connecting in the axial direction with the main rubber elastic body 21 and elastically connecting the first and second flanges 12, 15. A hollow portion 29 consisting of a slot that extends from the second axial end to the first end at a medial location in the circumferential direction of the main rubber elastic body 21, with the distal end thereof reaching the side rubber elastic body 27.

The engine mount 10 is positioned so that the axial direction faces in the left-right direction of the vehicle and the main rubber elastic body 21 is situated vertically below the inner member 11, with the inner fitting 11 attached to an engine-side bracket E of the vehicle and the outer fitting 14 attached to a body-side bracket B of the vehicle. In the description hereinbelow, vertical, left-right, and front-back relationships of the components of the engine mount 10 will be described in terms of vertical, left-right, and front-back of the vehicle (with the front of the plane of the paper representing the front)

when mounted on the vehicle with the axial direction depicted in FIG. 1 coincident with the left-right direction.

The inner fitting 11 is a metallic thick-walled fitting of round cylindrical shape having integrally formed in proximity to a first axial end (the right end in the drawing) a first flange 12 of thick plate shape extending downward from the outer circumferential face on the lower side, over a range equivalent to approximately one-fourth the circumference. The first flange 12 extends substantially parallel from the outer circumferential face of the inner fitting 11 with the distal edge thereof spreading out slightly in the width direction. The diametrical length to the distal edge is of a dimension extending further outward from the outside periphery of the main portion of the outer fitting 14. The first flange 12 is integrally formed of thick metal pipe by means of forging or the like. The outer fitting 14 is a metallic thin-walled fitting of round cylindrical shape whose axial length is approximately one-half the axial length of the inner fitting 11, having disposed at a first end thereof an annular second flange 15 that extends diametrically outward along the entire circumference. The older fitting 14 is situated in an area of the inner fitting 11 extending from proximity to the second axial end thereof (the left end in the drawing) to a generally medial location in the axial direction, with the second flange 15 opposed to and spaced apart from the first flange 12. The outer fitting 14 is positioned with the axis O thereof offset slightly downward to the axis I of the inner fitting 11, and parallel to the inner fitting 11.

In a range of an approximately 120° center angle of the outer circumferential face on the lower side of the inner fitting 11, the main rubber elastic body 21 extends from a range equivalent to approximately one-fourth the circumference to the inside circumferential face of the outer fitting 14, as well as being situated between the axial ends of the outer fitting 14, so that the inner and outer fittings 11, 14 are elastically linked. The main rubber elastic body 21 is opposed to the first flange 12 in the direction of axial extension, has an axis-perpendicular cross section that is substantially identical in shape to the first flange 12, and is situated extending from the second axial end to the first axial end of the outer fitting 14. On the outside circumferential face of the inner fitting 11 continuing on from the main rubber elastic body 21 is disposed a thin rubber coated portion 22.

A thin rubber coating layer 23 is formed on the inside circumferential face of the outer fitting 14. In the rubber coating layer 23, an upper rubber portion 24 projects up on the opposite side from the main rubber elastic body 21 with the inner fitting 11 therebetween. Left side and right side rubber portions 25, 26 are disposed to either side of the inner fitting 11 in the horizontal direction. The upper rubber portion 24 is situated with the face thereof in opposition to the inner fitting 11 across a small gap 14a between it and the upper side of the inner fitting 11 oriented substantially on the horizontal. The left side and right side rubber portions 25, 26 have perpendicular faces which are constituted by the faces thereof in opposition to the inner fitting 11 across large gaps 25a, 26a, from the left and right sides of the inner fitting 11 in the diametrical direction. These gaps 24a, 25a, 26a interconnect into one to form a generally inverted U-shaped configuration. The main rubber elastic body 21, rubber coating layer 23, upper rubber portion 24, and left side/right side rubber portions 25, 26 are left-right symmetric with respect to a vertical line passing through the axis. The upper rubber portion 24 also functions as an upper stopper for the inner fitting 11. The left side/right side rubber portions 25, 26 function as lateral stoppers for the inner fitting 11. With this arrangement, a lateral stopper mechanism and a vertical stopper mechanism is provided between the inner fitting 11 and the outer fitting 14 to limit an amount of displacement of the inner fitting 11 relative to the outer fitting 14. It should be noted that the rubber portions 24, 25, 26 may be formed on the side of the inner fitting 11, alternatively.

Between the second flange 15, the end of the main rubber elastic body 21 diametrically inward therefrom, and the first flange 12, there is disposed a side rubber elastic body 27 continuous with the main rubber elastic body 21 in the axial direction, whereby the two flanges 12, 15 are integrally connected. A thin rubber coating layer 28 extending from the side rubber elastic body 27 covers one end face of the first flange 12. On the axial left end face of the main rubber elastic body 21, at a location contacting the inside circumferential face of the outer fitting 14 and situated at the center in the circumferential direction, there is disposed a hollow portion 29 which is a circular slot extending in the axial direction with the distal end thereof ingressing slightly into the interior of the side rubber elastic body 27. By means of this hollow portion 29, the main rubber elastic body 21 is substantially bifurcated on the outer fitting 14 side where linked to the outside circumferential face of the outer fitting 14. The main rubber elastic body 21, upper rubber portion 24, left side/right side rubber portions 25, 26, side rubber elastic body 27, and rubber coating layer 28 are integrally formed with the engine mount 10 by means of setting the inner fitting 11 and outer fitting 14 in the forming mold and forming them simultaneously by carrying out rubber vulcanization molding.

As shown in FIG. 4, the engine mount 10 formed in the preceding manner is installed in a vehicle by passing a bolt 17 through a bolt hole in the inner fitting 11 and fastening it to the engine-side bracket E mounted on the engine side, while press-fitting onto the outer circumferential face of the outer fitting 14 the tubular portion of the body-side bracket B mounted on to body-side. By installing the engine mount 10 on the vehicle, downward load is exerted on the inner fitting 11, as a result of which the axis O of the outer fitting 14, which was deliberately offset slightly downward from the axis I of the inner fitting 11 in the manufacturing stage, is now substantially aligned therewith so that the inner and outer fittings 11, 14 are positioned substantially coaxial to one another.

In the engine mount according to this embodiment having the arrangement described hereinabove, the first flange 12 of the inner fitting 11 and the second flange 15 of the outer fitting 14 are positioned opposed to one another but spaced apart, with the two flanges elastically connected by the side rubber elastic body 27, and with the side rubber elastic body 27 integrally connected with the main rubber elastic body 21 in the axial direction. By means of this, the engine mount 10 can be given appreciably higher spring characteristics in the axial direction than a conventional engine mount with only a main rubber elastic body. In this embodiment, the vertical direction (axis-perpendicular direction): left-right direction (axial direction):front-back direction (axis-perpendicular direction) spring constant ratio is approximately on the order of 1:0.4: 0.3. As a result, In this embodiment, the engine mount 10, when being mounted on the vehicle with the axial direction facing the left-right direction of the vehicle; can sufficiently attenuate vibration in the left-right direction of the vehicle.

In the main rubber elastic body 21, the hollow portion 29 extends towards the first axial end from the second axial end at a medial location the circumferential direction thereof, with the distal end extending into the side rubber elastic body 27. By so doing, it is possible for the spring constant of the engine mount 10 in the vehicle left-right direction (axial direction) to exert no effect on spring constant in the axis-perpendicular directions, i.e. the vertical and front-back directions of the vehicle, that is, for it to be established independently of spring constant in the vertical and front-back directions. As a result, according to the first embodiment, spring constant in the vertical, front-back, and left-right directions of the engine mount 10 can be matched appropriately to the vibration characteristics of the vehicle. Additionally, as regards the magnitude of the spring constant of the left-fight direction of the engine mount 10, this can be carried out through adjustment of the side rubber elastic body 27 in addition to the main rubber elastic body 21. As regards the amount of the spring constant of the vertical and front-back directions of the engine mount 10, as shown in FIG. 2, these can be adjusted by means of the slope angle θ and circumferential thickness d of the bifurcated portions of the main rubber elastic body 21. A larger slope angle θ means lower spring constant in the vertical direction and higher spring constant in the front-back direction. Greater thickness d is associated with higher spring constant in the vertical and front-back directions.

By providing the main rubber elastic body 21 with the hollow portion 29, compressing deformation in the vertical direction of the main rubber elastic body 21 is absorbed by the hollow portion 29, permitting uniform deformation of the main rubber elastic body 21, as a result of which the durability of the rubber elastic body 21 is increased. Additionally, in the engine mount 10 described above, since the hollow portion 29 is situated at a medial location in the circumferential direction of the main rubber elastic body 21, the main rubber elastic body 21 is bifurcated equally to either side by means of the hollow portion 29. Thus, spring characteristics in the axis-perpendicular directions are established uniformly by means of the main rubber elastic body 21, and the vibration-attenuating function of the main rubber elastic body 21 is exhibited properly. Also, in this embodiment, by employing an inner fitting 11 of cylindrical she as the inner fitting, attaching it to an engine-side member E by means of a bolt 17 or other fastener passed through the bore of the inner fitting 11, the engine mount 10 can be given a simple configuration that occupies the least space.

Figure 10:
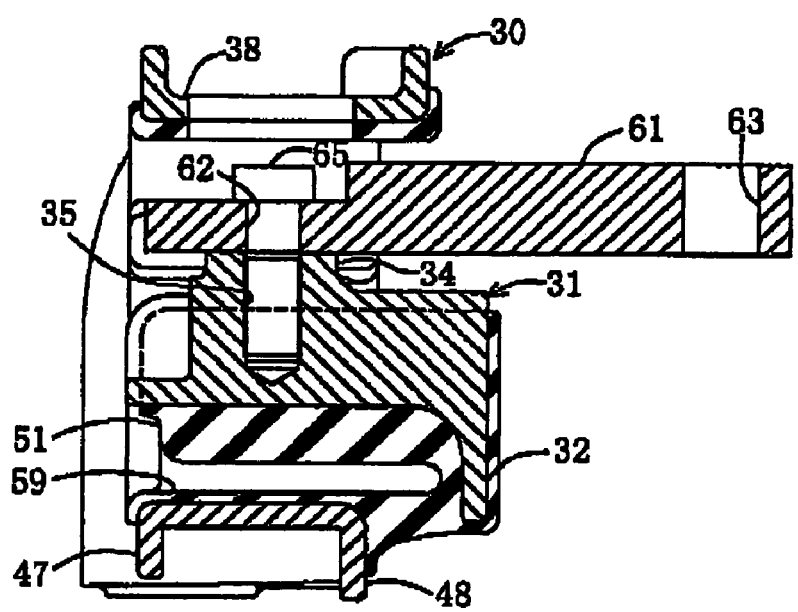
FIG. 10 is a cross sectional view taken along line 10-10 of FIG. 11 illustrating the engine mount of FIG. 5 installed on the vehicle.
Figure 11:
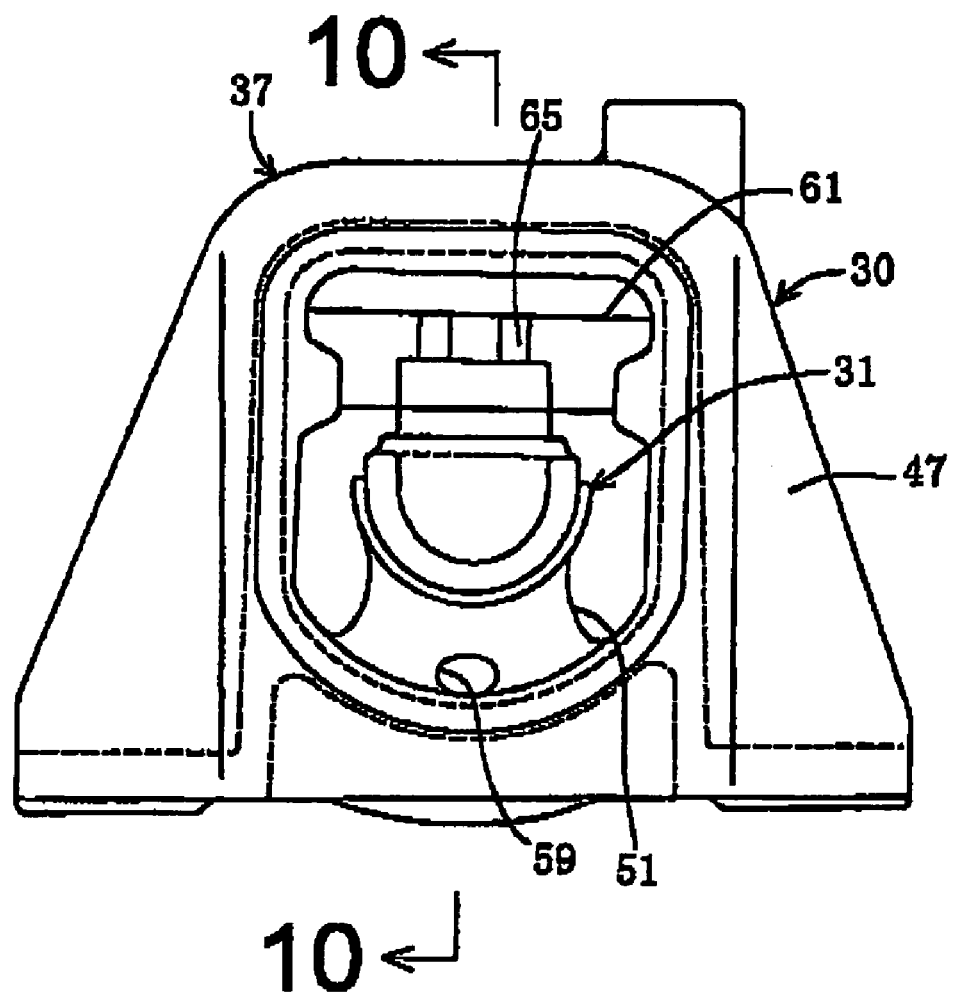
FIG. 11 is a left-side elevational view of the engine mount of FIG. 5.

A second embodiment is now described. FIGS. 5-9 are, respectively, a cross sectional view, a left side view, a right side view, a plan view, and a bottom view of the engine mount 30 of the second embodiment. FIGS. 10 and 11 are respectively a sectional view and a left side view of the engine mount 30 with the inner fitting 31 mounted on an engine-side member E.

The engine mount 30 comprises a semi-circular rod-shaped Inner fitting 31 having a first flange 32 that extends diametrically outward at a first axial end thereof; a cylindrical outer fitting 36 disposed diametrically outside the inner fitting 31, and having at a first axial end a right flange 48 that extends outwardly in the diametrical direction and is positioned in juxtaposition to but spaced apart from the first flange 32; a main rubber elastic body 51 elastically connecting the outside circumferential face of the inner fitting 31 and the inside circumferential face of the outer fitting 36; a side rubber elastic body 56 linked with the main rubber elastic body 56 in the axial direction and elastically connecting the first flange 32 and the right flange 48; and a hollow portion 59 consisting of a circular slot that extends from the second axial end to the first end at a medial location in the circumferential direction of the main rubber elastic body 51, with the distal end thereof reaching the side rubber elastic body 56.

The engine mount 30 is positioned so that the axial direction faces in the left-right direction of the vehicle and the main rubber elastic body 51 is situated towards the bottom in the vertical direction, and is attached to the engine side by means of an engine-side bracket 61 attached to the inner fitting 31, and to the body-side by the outer fitting 31, which doubles as a body-side bracket. In the description hereinbelow, vertical, left-right, and front-back relationships of the components of the engine mount 30 will be described in terms of vertical, left-right, and front-back of the vehicle (with the front of the plane of the paper representing the front) when mounted on the vehicle with the axial direction coincident with the left-right direction, as depicted in FIG 10.

The inner fitting 31 is a metal fitting of semi-circular rod-shape with the upper portion removed, having integrally formed at a first axial end (the right end in the drawing) a first flange 32 of thick plate shape extending downward from the outer circumferential face over a range equivalent to approximately one-fourth the circumference. The first flange 32 extends substantially parallel from the outer circumferential face of the inner fitting 31 with the distal edge thereof spreading out slightly in the width direction. The diametrical length to the distal edge is of a dimension extending further outward from the outside periphery of the main portion of the outer fitting 36. A portion of the inner fitting 31 in proximity in the axial direction to the second axial end (left end in the drawing) thereof constitutes a semicircular tubular wall portion 33 having a recess that is recessed in arcuate shape along the outer circumferential face from the upper side. The axially medial portion of the inner fitting 31 adjacent to the semicircular tubular wall portion 33 constitutes a round cylindrical mounting projection 34 that projects slightly upward with a mounting hole 35 having a screw thread being disposed in the center of the mounting projection 34. The inner fitting 31 is integrally formed by means of die-cast aluminum alloy or the like.

Figure 8:
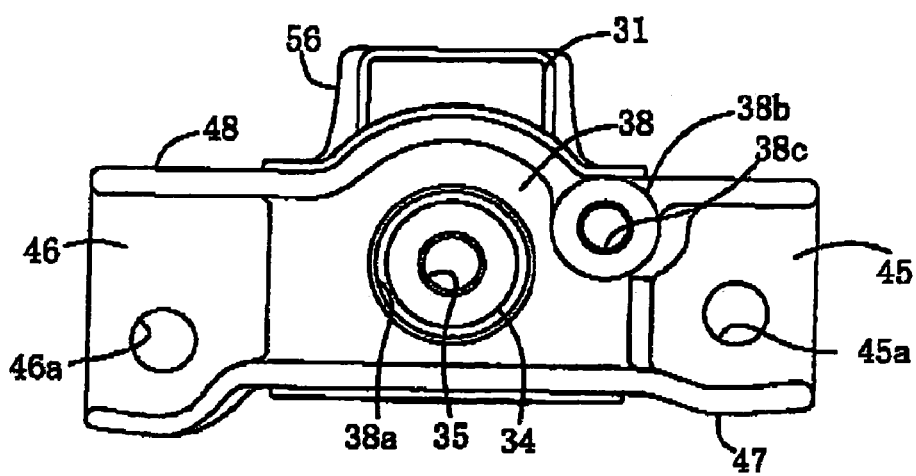
FIG. 8 is a top plane view of the engine mount of FIG. 5.
Figure 9:
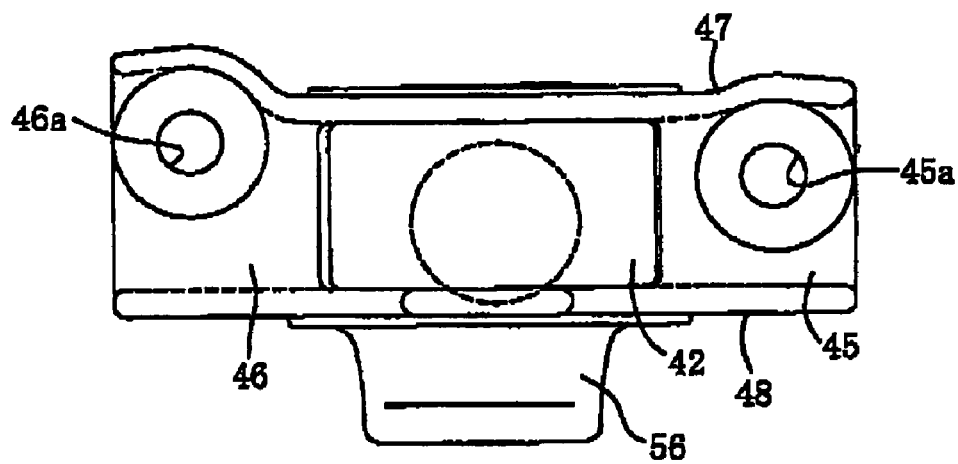
FIG. 9 is a bottom plane view of the engine mount of FIG. 5.

The outer fitting 36 is a thin-walled cylindrical fitting integrally formed of die-cast aluminum alloy or the like, having a vertically elongated cylindrical main body 37 whose axis-perpendicular cross section is of generally oblong shape. Axial length is about a half of the axial length of the inner fitting 31. The main body 37 has an integral top plate portion 38 of flat plate shape, front and back plate portions 39, 41, and a lower plate portion 42 of arcuate shape bowing downward. Also provided are front and back lower plate portions 43, 44 that extend downward from the front and back plate portions 39, 41, respectively, front and back floor plate portions 45, 46 that extend bent at right angles in the front and back directions from the front and back lower plate portions 43, 44, respectively. As shown in FIG. 8, the top plate portion 38 at the axial right end portion thereof projects slightly in arcuate shape in a front-back symmetric configuration viewed from above, with a through-hole 38a larger in diameter than the cylindrical mounting projection 34 disposed in the center thereof, On the right upper face at the front of the top plate portion 38 is disposed a mounting projection 38b of cylindrical shape having a screw hole 38c in the center, that projects vertically. The front floor plate portion 45 is of generally oblong shape with a mounting hole 45a disposed at its center. The back floor plate portion 46 bulges outwardly in arcuate shape from the axial left end, with a mounting hole 46a provided at the left end.

At each axial end of the top plate portion 38, front/back plate portions 39, 41 and lower plate portion 42 are disposed left and right flanges 47, 48 that extend outward in the axis-perpendicular direction surrounding to include the axial edges of the front/back lower plate portions 43, 44 and the front/back floor plate portions 45, 46. The left and right flanges 47, 48 at the lower ends thereof extend as far as the locations of the front/back floor plate portions 45, 46, and at the upper ends thereof are situated above the top plate portion 38 to produce a generally isosceles trapezoidal shape viewed from the axial direction, with the upper side thereof rounded in arcuate shape at each side. The outer fitting 36 is rotated slightly to the rear about the front-back center location of the top plate portion 38 with respect to the vertical plane M of the inner fitting 31, so as to be positioned inclined slightly with respect to the vertical plane M.

In a range of an approximately 90° center angle of the outer circumferential face on the lower side of the inner fitting 31, the main rubber elastic body 51 extends from a range equivalent to approximately one-half the circumference to the inside circumferential face of the outer fitting 36, as well as being situated between the axial ends, elastically connecting the inner and outer fittings 31, 36. The main rubber elastic body 51 is opposed to the first flange 32 in the direction of axial extension, has an axis-perpendicular cross section that is substantially identical in shape to the first flange 32, and is situated extending to the right flange 43 from the second axial ends of the inner and outer fittings 31, 36. On the outer circumferential face of the inner fitting 31, except for the upper face, there is disposed a thin rubber coated portion 52 continuing on from the main rubber elastic body 51. A thin rubber coating layer 54 continuous from the main rubber elastic body 21 is disposed on the inside circumferential face of the outer fitting 36. In the rubber coating layer 54, at locations on the front/back plate portions 39, 41 slightly above the upper end of the inner fitting 31, rubber projections 55 project out slightly in opposition to one another. The main rubber elastic body 51, rubber coated portion 52, and rubber coating layer 54 are generally left-right symmetric with respect to a vertical line passing through the axis.

Between the right flange 48, the end of the main rubber elastic body 51 diametrically inward therefrom, and the first flange 32, there is disposed a side rubber elastic body 56 continuous with the main rubber elastic body 51 in the axial direction, with the tow rubber elastic bodies 51, 56 integrally linked. A thin rubber coating layer 57 extending from the side rubber elastic body 56 covers one end face of the first flange 32. On the axial left end face of the main rubber elastic body 51, at a location contacting the inside circumferential face of the outer fitting 36 and situated at a center location in the circumferential direction, there is disposed a hollow portion 59 extending in the axial direction with the distal end thereof ingressing slightly into the interior of the side rubber elastic body 56. By means of this hollow portion 59, the main rubber elastic body 51 is substantially bifurcated on the outer fitting 36 side where linked to the outside circumferential face of the outer fitting 36. The main rubber elastic body 51, the rubber coated portion 52 and rubber coating layer 54, and the side rubber elastic body 56 and rubber coating layer 57 are integrally formed with the engine mount 30 by means of setting the inner fitting 31 and outer fitting 36 in the forming mold and forming them simultaneously by carrying out rubber vulcanization molding.

As shown in FIGS. 10 and 11, the engine mount 30 formed in the preceding manner is fastened to the engine-side bracket 61 by inserting the distal end of the engine-side bracket 61 between the mounting projection 34 of the inner fitting 31 and the top plate portion 38 of the outer fitting 36, aligning the mounting hole 62 thereof with the mounting hole 35 of the mounting projection 34 and threading a bolt 65 through the mounting holes 35, 62. The front and back floor plate portions 45, 46 of the outer fitting 36 (which doubles as the mounting bracket to the car body) are then superposed onto a car body member (not shown) and a bolt is threaded through the mounting holes 45a, 46a to effect fastening to the car body member. By then fastening the engine-side bracket 61 to an engine-side member (not shown) by means of a bolt or other fastener through the mounting hole 63, the mounting is installed on the vehicle with the axial direction facing left-right.

In the engine mount 30 according to the second embodiment having the arrangement described hereinabove, the firs flange 32 of the inner fitting 31 and the right flange 48 of the outer fitting 36 elastically linked in the axial direction by the side rubber elastic body 56, and with the side rubber elastic body 56 integrally linked with the main rubber elastic body 51 in the axial direction With this arrangement, the engine mount 30 can be given appreciably higher spring constant in the axial direction than the spring constant in the axial direction of a conventional engine mount with only a main rubber elastic body. In the second embodiment, as well, the vertical direction (axis-perpendicular direction):left-right direction (axial direction):front-back direction (axis-perpendicular direction) spring constant ratio is approximately on the order of 1:0.4:0.3. As a result, in the second embodiment as well, the engine mount 30, when mounted on a vehicle with the axial direction facing the left-right direction of the vehicle, can sufficiently attenuate vibration in the left-right direction of the vehicle.

In the main rubber elastic body 51, the hollow portion 59 extends towards the first end from the second axial end at a medial location the circumferential direction thereof, with the axially distal end extending into the side rubber elastic body 56. This arrangement makes it possible for the spring constant in the left-right direction (axial direction) of the rubber elastic body in its entirety to exert no effect on spring constant in the axis-perpendicular directions, i.e. the vertical and front-back directions of the vehicle, that is, for it to be established independently of spring constant in the vertical and front-back directions. As a result, according to the second embodiment, as well, spring constant in the vertical, front-back, and left-right directions of the engine mount 30 can be matched appropriately to the vibration characteristics of the vehicle. Additionally, as regards adjustment of the spring constant of the vertical, front-back, and left-right directions, as in the first embodiment, for spring constant in the left-right direction, this can be accomplished through adjustment of the main rubber elastic body 51 and the side rubber elastic body 56, and for spring constant in the vertical direction and front-back direction, through adjustment of the slope angle and circumferential thickness of the bifurcated portions of the main rubber elastic body 51.

By providing the main rubber elastic body 51 with the hollow portion 59, compressing deformation in the vertical direction of the main rubber elastic body 51 is absorbed by the hollow portion 59, permitting uniform deformation of the main rubber elastic body 51, as a result of which the durability of the rubber elastic body 51 is increased. Additionally, in the engine mount 30 described above, since the hollow portion 59 is situated at a medial location in the circumferential direction of the main rubber elastic body 51, the main rubber elastic body 51 is bifurcated equally to either side by means of the hollow portion 59. Thus, spring characteristics in the axis-perpendicular directions are established uniformly by means of the main rubber elastic body 51, and the vibration-attenuating function of the main rubber elastic body 51 is exhibited properly. Also, in the second embodiment, by having the outer fitting 36 double as the body-side bracket, installation of the engine mount 30 onto a body-side member is facilitated, reducing the labor entailed in the installation procedure.

In the embodiments hereinabove, the inner fitting 11, 31 is fastened to an engine-side member and the outer fitting 14, 36 is fastened to a body-side member. However, the reverse would be possible as well. The engine mounts shown in the embodiments and modification example hereinabove are merely exemplary. It is also to be understood that the present invention may be embodied with various other changes, modifications and improvements, which may occur to those skilled in the art, without departing from the spirit and scope of the invention defined in the following claims.

According to the present invention, it is possible to appreciably increase spring characteristics of an engine mount in the axial direction, and as a result, when mounted on a vehicle with the axial direction facing in the left-right direction of the vehicle, to achieve sufficient attenuation of vibration in the left-right direction of the vehicle; and by providing the main rubber elastic body with a hollow portion, to make it possible to properly match spring constant in the vertical, front-back, and left-right directions of the engine mount with the vibration characteristics of the vehicle, and additionally increasing the durability of the main rubber elastic body.

Alternatively, the engine mount (10, 30) may be provided with desirable spring characteristics required depending on required damping characteristics, for example, by suitably adjusting the main rubber elastic body 51 and the side rubber elastic body or by adjusting the slope angle θ and circumferential thickness d of the bifurcated portions of the main rubber elastic body 21. For instance, the engine mount may be tuned such that the vertical direction (axis-perpendicular direction): left-right direction (axial direction): front-back direction (axis-perpendicular direction) spring constant ratio is on the order of 1:(0.4-0.6):(0.3-0.6). It should be appreciated that the engine mount (10, 30) may be tuned in a variety of spring constant ratio orders, depending on the required characteristics.

What is claimed is:

1. An engine mount for use in a vehicle, comprising:
   an inner fitting;
   a cylindrical outer fitting disposed surrounding the inner fitting and positioned between two axial ends of the inner fitting; and
   a main rubber elastic body elastically connecting an outer circumferential face of the inner fitting and an inner circumferential face of the outer fitting in a direction of axial elongation of a side rubber elastic body, the main rubber elastic body being compressed by an initial load of an engine applied thereto in an axis perpendicular direction, wherein
   the inner fitting has a first flange that extends outwardly in the axis-perpendicular direction at one circumferential position at a first axial end thereof over a range equivalent to approximately one-fourth of a circumference of the inner fitting;
   the outer fitting has, at a first axial end thereof, a second flange extending outwardly in the axis-perpendicular direction at the same one circumferential position where the first flange is located, and is positioned in opposition to, but spaced apart from, the first flange portion in an axial direction;
   the side rubber elastic body elastically connects the first and second flanges;
   a hollow portion is located at the circumferential position where the first and second flanges are located, and extends from a second axial end toward a first axial end of the main rubber elastic body with a distal end thereof reaching as far as an interior of the side rubber elastic body, and bifurcating the main rubber elastic body at an inside circumferential face of the outer fitting so as to substantially isolate the side rubber elastic body from the main rubber elastic body; and
   the engine mount is positioned with the axial direction facing a left-right direction of the vehicle, and is attached with the inner fitting to either a component on an engine side or a component on a body side of the vehicle, and with the outer fitting to either a component on the engine side or a component on the body side, so that the main rubber elastic body is disposed above or below the inner fitting, and the inner and outer fittings extend radially outward on a side where the main rubber elastic body is disposed.

2. An engine mount according to claim 1, wherein the hollow portion is situated at a medial location in the circumferential direction of the main rubber elastic body.

3. An engine mount according to claim 1, wherein the inner fitting is of cylindrical shape, and is attached to the component on the engine side or the component on the body side by means of a mounting member of a rod which is passed through a bore of the inner fitting.

4. An engine mount according to claim 1, wherein the outer fitting is integrally formed with an engine-side bracket or with a body-side bracket.

5. An engine mount according to claim 1, wherein a lateral stopper mechanism and/or a vertical stopper mechanism is provided between the inner fitting and the outer fitting to limit an amount of displacement of the inner fitting relative to the outer fitting.

\* \* \* \* \*